United States Patent
Kostecki

(10) Patent No.: US 7,017,544 B2
(45) Date of Patent: Mar. 28, 2006

(54) CARBURETTOR VIBRATION DAMPER

(75) Inventor: Andrew Kostecki, Perth (AU)

(73) Assignee: Ames Nominees Pty. Ltd., Morely (AU)

( * ) Notice: Subject to any disclaimer, the term of this patent is extended or adjusted under 35 U.S.C. 154(b) by 0 days.

(21) Appl. No.: 10/835,705

(22) Filed: Apr. 30, 2004

(65) Prior Publication Data
US 2005/0183688 A1   Aug. 25, 2005

(30) Foreign Application Priority Data
Feb. 23, 2004   (AU) ............................... 2004900861

(51) Int. Cl.
*F02M 19/00*   (2006.01)
*F16F 15/08*   (2006.01)

(52) U.S. Cl. ........................... 123/184.46; 123/184.21; 123/198 E

(58) Field of Classification Search ............... 123/437, 123/195 A, 184.21, 184.22, 184.23, 184.39, 123/184.46, 184.59, 198 E; 267/136, 2
See application file for complete search history.

(56) References Cited

U.S. PATENT DOCUMENTS

| 3,730,509 | A | * | 5/1973 | Jorn | 267/152 |
| 3,873,077 | A | * | 3/1975 | Jorn | 267/152 |
| 4,224,919 | A | * | 9/1980 | Appelbaum | 123/195 A |
| 4,498,433 | A | * | 2/1985 | Ogawa | 123/90.38 |
| 4,788,951 | A |   | 12/1988 | Nagashima | |
| 4,968,010 | A | * | 11/1990 | Odobasic | 267/162 |
| 5,243,939 | A |   | 9/1993 | Viktorsson et al. | |
| 5,501,192 | A | * | 3/1996 | Cutler | 123/336 |
| 5,641,153 | A | * | 6/1997 | Gwinn | 267/294 |
| 5,738,330 | A | * | 4/1998 | Folkens et al. | 248/632 |
| 6,079,698 | A | * | 6/2000 | Patterson et al. | 267/33 |
| 6,647,946 | B1 |  | 11/2003 | Ohsawa et al. | |

FOREIGN PATENT DOCUMENTS

DE   27 42 616   3/1979

* cited by examiner

*Primary Examiner*—Tony M. Argenbright
(74) *Attorney, Agent, or Firm*—R. Neil Sudol; Henry D. Coleman; William J. Sapone

(57) ABSTRACT

Use of an vibration damper to dampen vibration transmitted from an engine to a carburettor is found to enhance carburettor and therefore engine performance. The vibration damper is conveniently placed axially between the carburettor and an end of the intake manifold, and may take the form of a laminate of an elastomeric block adhered between and upstream and a downstream metal plate. Fasteners can extend from the metal plates into suitable apertures within the carburettor housing and inlet manifold without traversing the elastomeric block thereby enhancing the efficacy of the damper.

10 Claims, 3 Drawing Sheets

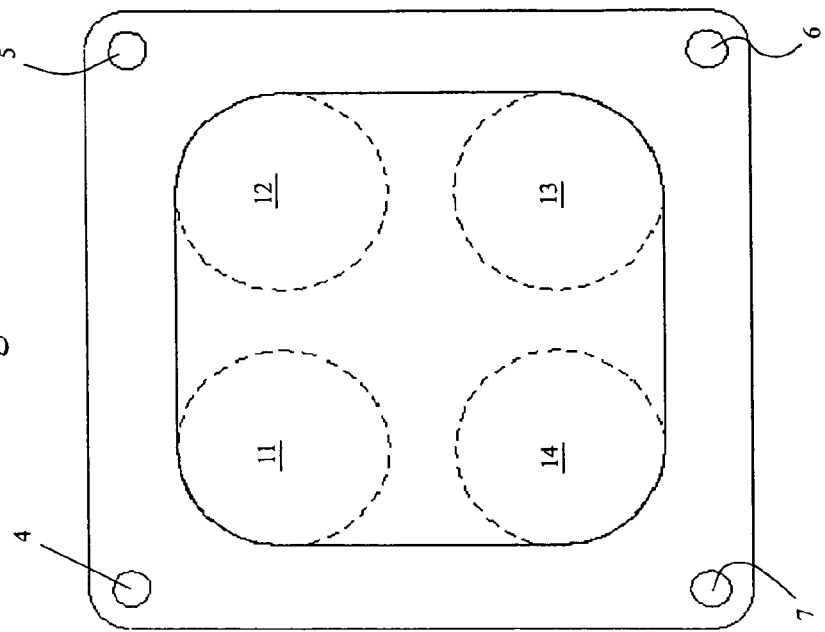
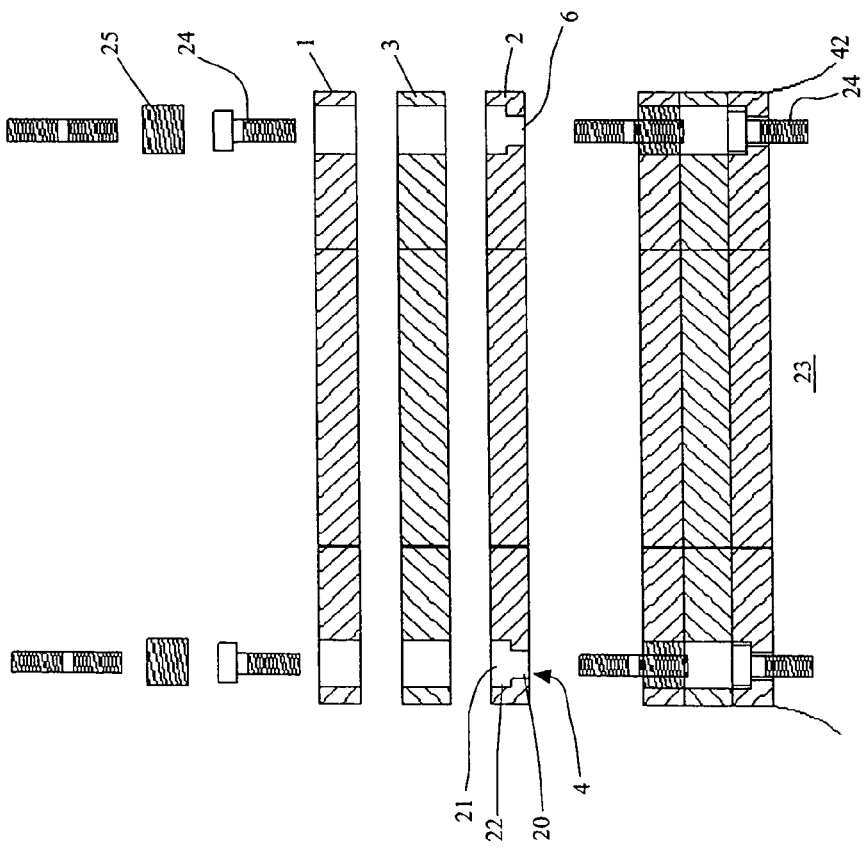

CARBURETTOR VIBRATION DAMPER

FIELD OF THE INVENTION

This invention relates to a vibration damper for reducing the impact of engine vibrations on the operation of a carburettor.

BACKGROUND TO THE INVENTION

Carburettors provide for the mixing of gasoline and air for intake via a manifold into the cylinder heads of an internal combustion engine.

Typically gasoline is drawn by venturi effect driven by the suction caused by downward movement of the piston in the cylinders from a reservoir via one or more jets into the throat of the carburettor.

It is desired that the air intake develops an even distribution of vapourized fuel of appropriate density on entry into cylinders of the engine so that maximum efficiency of combustion can be achieved. That is an ideal aspired to in carburettored fuel systems that is never fully achieved despite considerable research and development in the field.

Typically direct fuel injections systems have become standard for fuel intake of many internal combustion engines and are considered by many to provide a better delivery of fuel. There are, however, circumstances where carburettored systems are still common in particular in certain classes of competitive racing events.

SUMMARY OF THE INVENTION

The present invention results from a recognition of the extent of the impact resulting from unevenness of fuel distribution arises from vibrational transmission from the engine block through the inlet manifold to the carburettor. Such vibration is found to provide significant degradation of fuel distribution patterns. The vibration is found to impair the capacity to tune an engine optimally, for example, by adjusting the timing, adjusting the appropriate fuel/air ratios and balancing multibarrel carburettors. Steps may be taken to ameliorate the effects of vibration at a particular engine speed, however at a different engine speed the vibration will normally be different. Thus for example a vibration transmitted to the carburettor at an engine speed of about 2300 may be different to the vibration at an engine speed of 4000 rpm.

It is thought that the vibration may lead to interference by the float of the reservoir to even fuel distribution. The vibration may additionally lead to formation of waves of gradients of fuel within the throat of the carburettor. Cavitation and bubble or gas formation occur in the reservoir which means that as these pass through the jets no fuel is delivered momentarily additionally leading to irregular fuel distribution.

The inventor has devised a means in the form of a vibration damper for damping the traverse of engine vibrations to a carburettor. The vibration damper of the illustrated embodiment has been shown to reduce the adverse effects of these vibration. The vibration damper comprises an elastomeric damping block positioned in the fuel air intake conduit leading from the carburettor to the engine block. The elastomeric block damps vibration transmitted along the fuel air intake manifold.

The elastomeric damping block is preferably one piece and annular accommodating the fuel/air intake manifold. It may be positioned along the conduit perhaps dividing it in two. Preferably however it is positioned at either end of the conduit, and most preferably at the interface between the manifold and the carburettor. Typically the air/fuel intake manifold forms one aperture at that position which then branches to lead to the one or more cylinders that it services. This then provides for a reduced number of damping devices. The damping block, particular if fitted to a multibarrel carburettor may have multiple apertures, perhaps one for each throat of the multibarrel carburettor.

There is a difficulty of securing the damping block in place with no leakage to the manifold and in a manner that is economic and reliable. It is found that the elastomeric damping block can be positioned between two plates of a shape that joins axially spaced part ends of the manifold and the carburettor in a manner that these can readily and reliably be fastened into place with no, or at least no significant, modifications required to the manifold or carburettor.

The plates can be adhered to the elastomeric block, by known methods. Thus for rubber compounds a vulcanisation process may be used, or alternatively an adhesive can be used. Fasteners are used to fasten respective plates to the carburettor or manifold.

Preferably the fastening does not involve a compressive tensioning by, for example, urging of the two plates together by a nut and bolt (which may act to transmit vibration therethrough), or by pressing opposing surfaces together by applying a force indirectly, for example, urging the carburettor down onto the manifold. This means that the damping effect is principally determined by the nature of the elastomeric block, with minimal interference with the inherent damping characteristics of the block.

Furthermore it is very much preferred that the fastening of the vibration damper is reversible so that, for example, the carburettor can be removed for cleaning and servicing by removable fasteners.

The plates may take on the cross sectional shape of the manifold and carburettor at their normal interface for neatness of fit.

It is anticipated that a range of elastomeric materials may be used for the elastomeric block. The elastomeric material will preferably exhibit fuel resistance and can otherwise be selected empirically by its capacity to reduce damping of the carburettor. This may be determined visually or by touch. Alternatively or additionally various elastomeric material may be measured by their effects on engine performance. In a specific form the elastomeric material is a soft rubber and in a more specific form with a shore rating of about 40 shore. If the elastomer is too hard there will be too much transmission of vibration for the material to be effective. On the other hand if the elastomer is too soft it will not be robust enough to withstand the rigours of use in connection with an internal combustion engine. A preferred hardness where a thickness of block is in the order of 5–25 mm is in the range of 30–50 shore.

In one form the invention might be said to reside in a vibration damper connector comprising a rubber layer positioned between an upper plate and a lower plate the upper and lower plate having an aligned aperture for passage of fuel air mixture therethrough, the two plates being connected solely via the rubber layer, upper attachment means for connection of the upper plate with a carburettor, and lower attachment means for connection of the lower plate with an intake manifold.

This arrangement can be used for simple attachment axially between a manifold and a carburettor without the requirement of an adaptor to provide, for example, a connection with a rubber mount fitted radially between a carburettor proximal portion and an engine intake proximal portion.

The internal dimensions of the one or more apertures in the vibration damper may be selected as being the same as the corresponding apertures of the manifold and/or carburettor, alternatively it might be used to add some turbulence by restricting the dimensions relative to the carburettor and/or the manifold. Alternatively a similar effect might be achieved by providing for an enlargement of the one or more apertures, forming a groove in walls of the normal flow path of the fuel/air mixture.

The vibration damper may or may not be used in conjunction with further spacers to alter the length of the manifold to impart performance characteristics on the output of the engine at desired engine speeds.

In another form the invention might be said to reside in a method of placing a vibration damper at the interface between the intake manifold and the carburettor to reduce the transmission of vibration between the engine and carburettor.

For a better understanding aspects of the present invention are described by reference to drawings wherein,

BRIEF DESCRIPTION OF THE DRAWINGS

FIG. 1 is an exploded view of a first illustrated embodiment of the vibration damper of the present invention, FIG. 2 shows the first illustrated embodiment in position on top of the intake manifold, FIG. 3 is a plan view of the first illustrated embodiment of the vibration damper.

Figure 4:
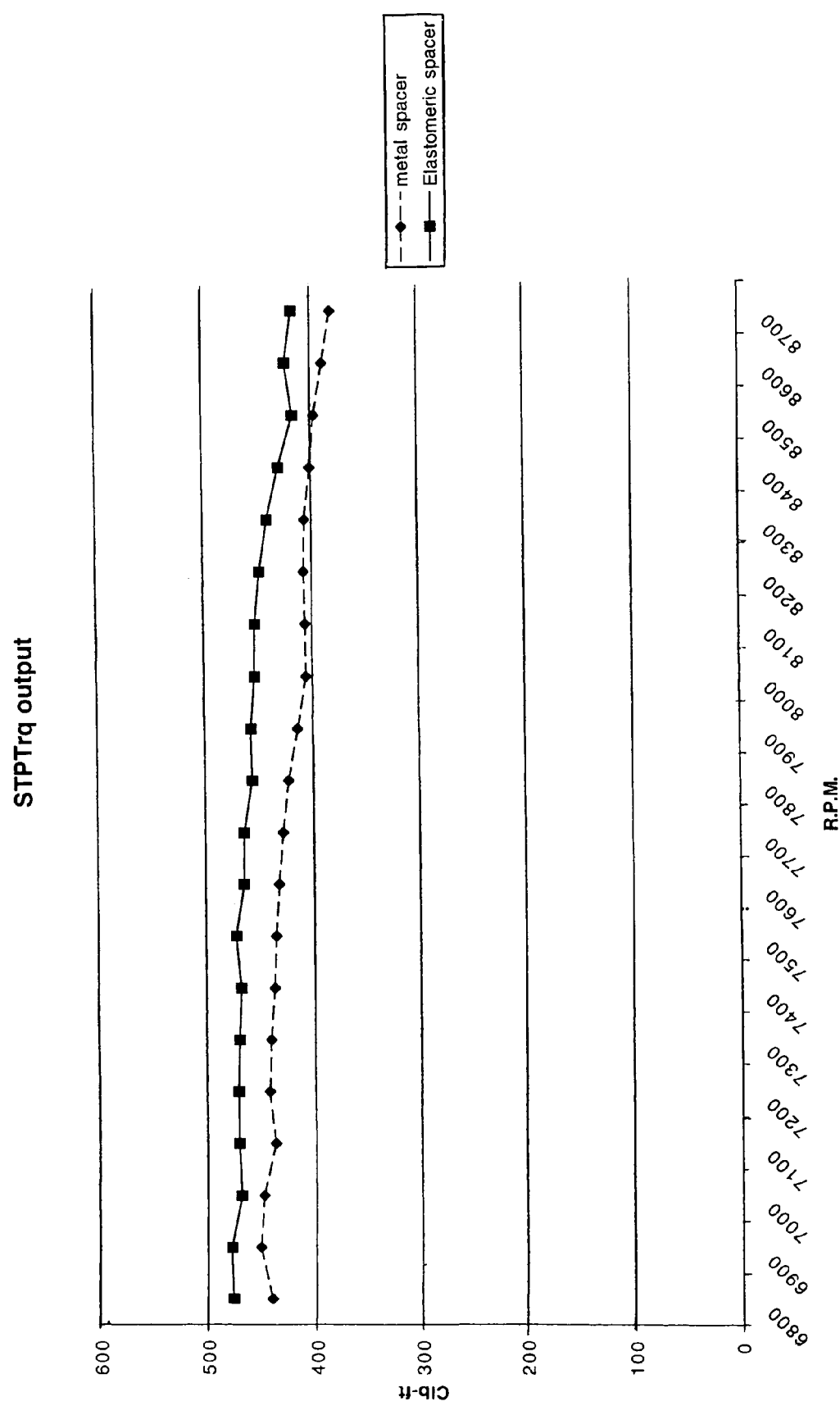
FIG. 4 shows the readout by a dynamometer for Brake Specific Fuel Consumption (BSFC) at incremental engine speeds with the illustrated embodiment of the vibration damper, or a correspondingly shaped metal spacer positioned between a four barrelled carburettor and intake manifold.

DETAILED DESCRIPTION OF THE ILLUSTRATED AND EXEMPLIED EMBODIMENTS OF THE INVENTION

The illustrated vibration damper consists of three layers, an upper plate (1) a lower plate (2) and an elastomeric damping block (3) therebetween. The upper plate and lower plate are fused to the elastomeric damping block to form the laminate vibration damper. The laminate structure is annular with a single central aperture (10). The aperture is square with rounded corners and is of dimensions to fit precisely over the carburettor throats and the manifold designed for them. The four throats of the four barrelled carburettor that this embodiment is designed for are shown in FIG. 3 (11, 12, 13, and 14). Four fastening apertures (4, 5, 6 and 7) are formed through the laminate structure.

The upper and lower plates are the same shape apart from the apertures and comprise 10 mm thick T6 alloy. Opposing external sides are spaced 156 mm apart. Opposing sides defining the periphery of the internal aperture are spaced 130 mm apart.

The elastomeric damper is a 40 shore hardness fuel resistant rubber compound and is 10 to 15 mm thick, with a cross sectional shape identical to that of the plates apart from the fastening apertures.

Fasteners for the vibration damper are shown separately in the exploded view of FIG. 1 and in place in FIG. 2. It can be seen that they do no fasten to the rubber at all. Additionally it can be appreciated that the rubber block is not put under compression apart from any influence from the weight of the carburettor and any air filters arrangements attached thereto.

It can be seen that all the fastening apertures consist of a narrower section (20) and a wider section (21) forming a shoulder (22) at the interface in the lower plate. A bolt is positioned through the assembled vibration damper and fastened into threaded apertures in the intake manifold part of which is shown at (23). The head of the bolt engages with shoulder (22) of the fastening aperture to hold the vibration damper against the manifold. If required (but not shown) a seal or gasket can be provided therebetween, which may be provided with a layer of sealant compound.

A threaded reducer (25) is screwed into the fastening aperture at the upper plate which has formed therein a corresponding screw thread to present a thread of the type presented by a standard manifold. The standard screw threaded carburettor stud can thus be used to fasten the carburettor to the vibration damper via the fastening thereto of the customary nuts. It can be seen that the elastomeric damping block represents the sole connection between the plates and the carburettor and manifold. Thus no vibrations can transverse the vibration damper without traversing the rubber block which can thus exert its damping effect.

The illustrated embodiment is found to be markedly beneficial on the performance of vehicles to which it is fitted. Specifically it is noted that fuel efficiency, and power output are improved. Thus a car being raced is able to accelerate better and can run on somewhat less fuel.

To illustrate the beneficial effects the vibrational damper illustrated and described above was fitted to a 4150 Holley carburettor on an 351 cubic inch Ford Windsor short motor with Cleveland style cylinder heads with an Edelbrock inlet manifold carrying a 4150-750 Holley carburettor (Holley Carburettors, Kentucky, U.S.A.). As a control a metal spacer of identical dimensions was fitted to the same engine and the measure was repeated. These were tested on a Superflow 901 Engine Dynamometer utilising Superflow Windyne software (Superflow Colorado Springs, Colo., USA). The water and oil temperatures were set at 175° F.

FIG. 4 shows the Brake Specific Fuel Consumption (BSFC) performance utilising the vibration damper compared to a metal spacer. BSFC is a measure of efficiency of the engine and reflects the volume of fuel used per power output. It can be seen that the elastomeric spacer produced improved efficiency.

Figure 5:
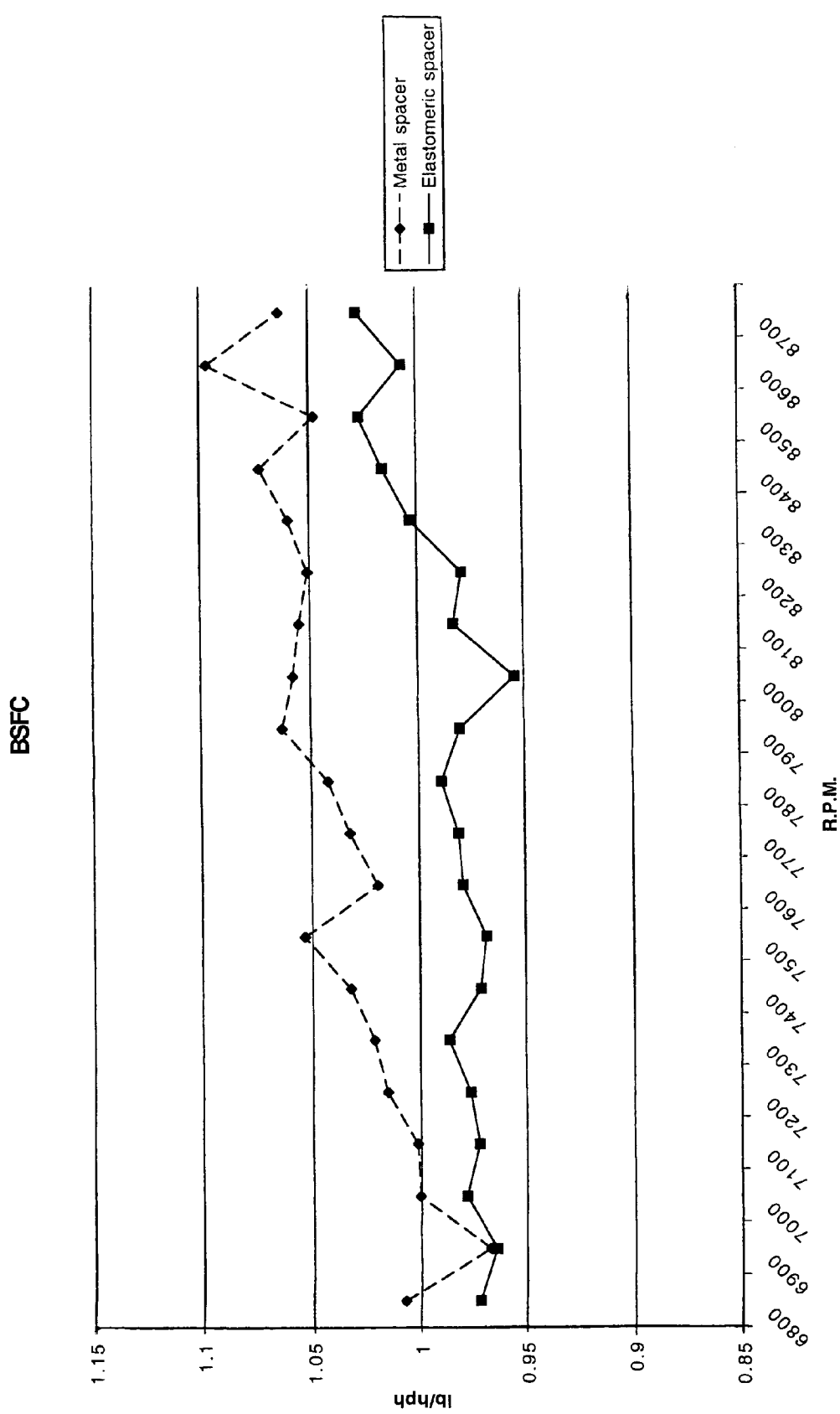
FIG. 5 shows the readout by a dynamometer for Standard Temperature Pressure Torque (STPTrq) output at incremental engine speeds with the illustrated embodiment of the vibration damper, or a correspondingly shaped metal spacer positioned between a four barreled carburettor and intake manifold.

FIG. 5 shows Standard Temperature Pressure Torque (STPTrq) output at a range of engine speeds. Again it can be seen that there is a consistent improvement in output when the vibration damper is used.

It is also noted that there is a marked reduction in vibration perceivably by placing a hand on the carburettor so dampened.

The use of the illustrated embodiment enabled better tuning of the fuel curve. More fuel is atomised leading to better combustion efficiency. This has also allowed reducing the advancement of the spark which typically is required for carburetted engines. It is estimated that the degree of reduction is by about 2° closer to Top Dead Centre (TDC).

On racing the vehicle tested and optimally tuned as above it was noted that acceleration was improved as was fuel efficiency.

Various features of the invention have been particularly shown and described in connection with the exemplified embodiments of the invention, however, it must be understood that these particular arrangements merely illustrate and that the invention is not limited thereto and can include various modifications falling within the spirit and scope of the invention.

The invention claimed is:

1. A vibration damper connector for connection between a carburetor and an adjacent end of an fuel air intake manifold of an internal combustion engine, the connector comprising a laminate of an upstream metal plate and a downstream metal plate and an elastomeric damping block adhered therebetween, said upstream plate and said downstream plate being substantially flat, the elastomeric damping block having a thickness of between 8 and 20 mm, and a hardness of between 30–50 shore, an aperture passing through the metal plates and the elastomenc damping block of the laminate, said aperture forming part of a fuel air conduit from the carburetor to the engine, fasteners respectively for connection to the carburetor and air intake manifold extending from the upstream and downstream plates, said fasteners not traversing the thickness of the elastomeric damping block.

2. The vibration damper connector as in claim 1 wherein the fasteners comprise upstream threaded studs extending upstream of the upstream metal plate for passage through corresponding apertures in the carburetor body, and downstream threaded studs extending downstream of the downstream metal plate for passage through corresponding apertures in the inlet manifold.

3. The vibration damper connector as in claim 1 wherein the fastening involves no compressive tensioning of the elastomeric dampening block, other than by any weight transmitted therethrough via the carburetor.

4. The vibration damper connector as in claim 1 where the block has a hardness of about 40 shore.

5. A vibration damper connector for connection between a carburetor and an adjacent end of an fuel air intake manifold of an internal combustion engine, the connector comprising a laminate of a substantially flat upstream metal plate and a substantially flat downstream metal plate and a substantially flat elastomeric damping block sandwiched therebetween, the metal plates and said damping block oriented substantially parallel to one another throughout, an aperture passing transversely through the metal plates and the elastomeric damping block of the laminate, said aperture forming part of a fuel air conduit from the carburetor to the engine, fasteners respectively for connection to the carburetor and air intake manifold extending from the upstream and downstream plates.

6. The vibration damper connector as in claim 5 wherein the fasteners comprise upstream threaded studs extending upstream of the upstream metal plate for passage through corresponding apertures in the carburetor body, and downstream threaded studs extending downstream of the downstream metal plate for passage through corresponding apertures in the inlet manifold.

7. The vibration damper connector as in claim 6 wherein the fasteners do not traverse the thickness of the elastomeric damping block.

8. The vibration damper connector as in claim 5 wherein the fastening avoids compressive tensioning of the elastomeric dampening block, other than by any weight transmitted therethrough via the carburetor.

9. The vibration damper connector as in claim 5 wherein the elastomeric damping block has a thickness of between 8 and 20 mm, and a hardness of between 30–50 shore.

10. The vibration damper connector as in claim 9 where the elastomeric damping block has a hardness of about 40 shore.

* * * * *